May 1, 1934.  C. M. DAY  1,957,326
DISPENSING DEVICE
Filed March 28, 1933
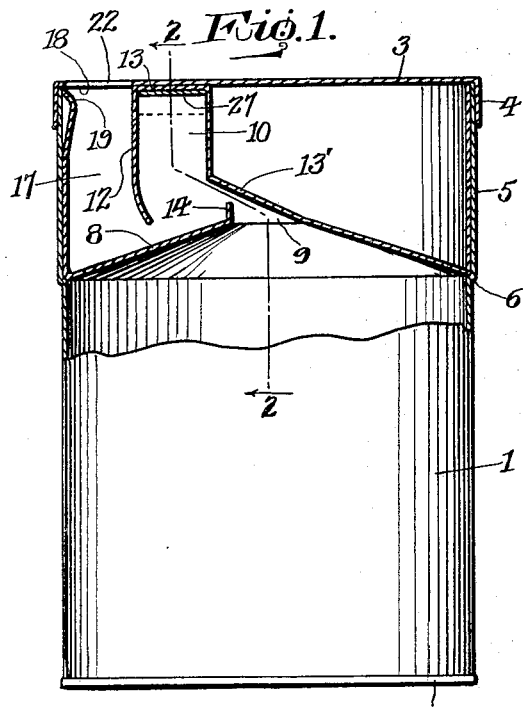
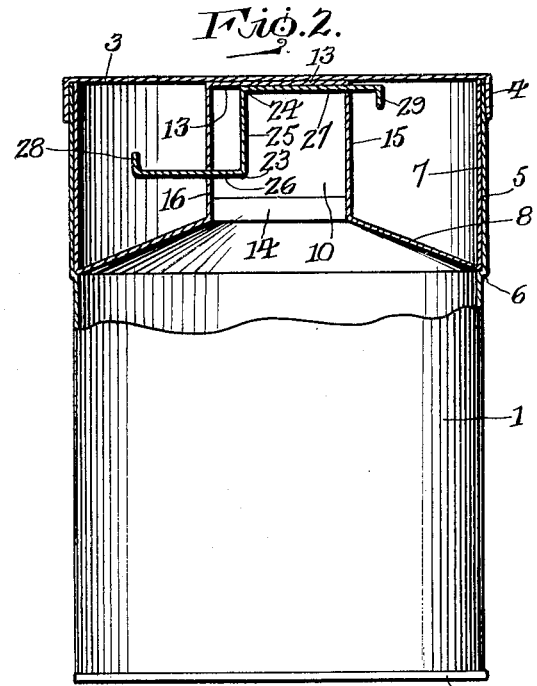
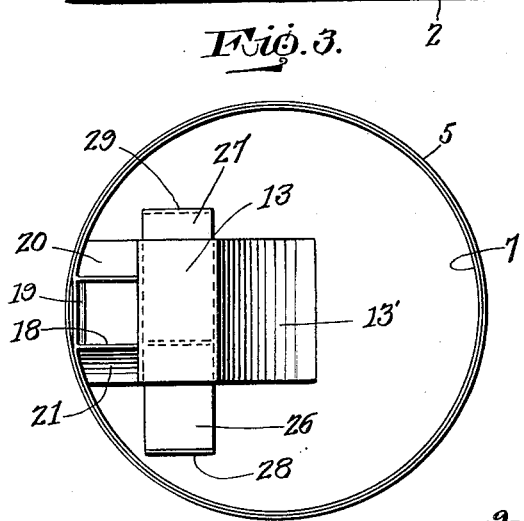
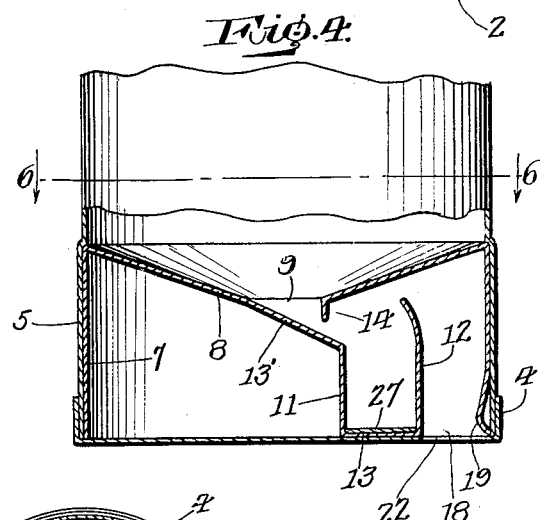
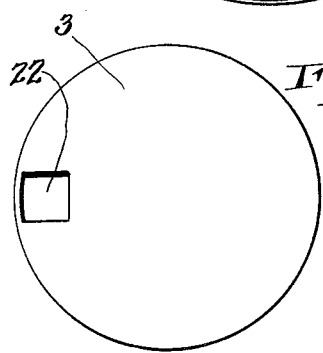
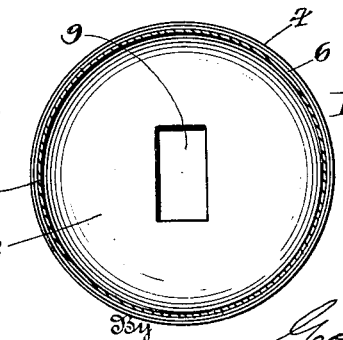
Inventor
Charles M. Day
By Geo. P. Kimmel
Attorney Patented May 1, 1934

1,957,326

UNITED STATES PATENT OFFICE 1,957,326

DISPENSING DEVICE

Charles M. Day, Ponca City, Okla., assignor of one-eighth to Howard S. Browne, one-eighth to S. H. Ladensohn, one-eighth to W. R. Johnson, and one-eighth to John F. Drake, all of Ponca City, Okla.

Application March 28, 1933, Serial No. 663,206

6 Claims. (Cl. 221—98)

This invention relates in general to a dispensing device, and more particularly has reference to a means for dispensing uniform quantities of a material from a container.

Various means have in the past been devised for dispensing materials from a container, but most of these have had no accurate means for measuring the quantity to be dispensed, nor have they been provided with any means for controlling the quantity to be dispensed. Furthermore, each of these have been of such a nature that either the container could not be opened for the purpose of refilling, or that if it could be so opened it was necessarily opened by some other means than the dispensing device itself.

With reference to the containers previously used and the dispensing device for the same, it has previously been necessary that the containers be specially constructed and adapted to cooperate and form a part of the dispensing device, thereby making it impossible to remove the dispensing device therefrom, but making it necessary on the other hand that a separate dispensing device be provided and made a more or less permanent part of each container.

One of the objects of this invention is to provide a dispensing device of the character set forth in which little or no modification of the container is required in order to receive the dispensing device, and hence in which the same dispensing device may be used for a large number of different containers.

It is also an object of this invention to provide a dispenser which may be adapted to dispense any desired quantity of material from a container and in which the quantity dispensed will at all times be positively controlled. The various parts and combinations embodied in this invention are so arranged that the material itself will form a seal to retard entrance of air into the container when the same is not in use, but in which the dispensing device itself is normally open at the top thereof. At the same time, a means is to be provided for closing this opening in the upper portion of the dispensing device when the same is to be out of use for any considerable length of time.

Other objects and advantages of this invention will become apparent from the following description taken in connection with the accompanying drawing, it being clearly understood that the same are by way of illustration and example only and are not to be taken as in any way limiting the scope or spirit of this invention. The spirit and scope of this invention is to be limited only by the prior art taken in connection with the accompanying claims.

Referring now more particularly to the drawing in which like numerals indicate corresponding parts throughout:

Figure 1 is a side view partly in section illustrating a container provided with one embodiment of this invention.

Figure 2 is a view taken along the line 2—2 of Figure 1.

Figure 3 is a top view of the device illustrated in Figure 1 showing the cover removed.

Figure 4 is a view similar to Figure 1 illustrating a step in the operation of this device.

Figure 5 is a plan view of the device of this invention with the cover in place thereon.

Figure 6 is a sectional view taken along the line 6—6 of Figure 4.

In accordance with this invention, the container 1 is provided and formed of sheet metal or other suitable material in a conventional manner. This container is preferably provided with a permanent bottom 2 and a removable cover 3. This removable cover 3 may be formed to engage the upper end of the container in any desired manner, preferably by being formed with a downwardly extending flange 4 as illustrated for the purpose of embracing the upper end of the container.

The container wall as illustrated is provided with an outwardly offset portion 5 adjacent its upper end, thereby forming a circumferential shoulder 6.

The dispensing device proper of this invention is positioned within the upper portion of the container and consists as shown of a cylindrical wall portion 7 adapted to fit within the outwardly offset portion 5 of the container and rest upon the shoulder 6. Extending from the lower end of this cylindrical wall 7 is a closure wall 8 which substantially closes the upper end of the container approximately on the level with the shoulder 6. At the central portion of this closure wall there is an opening 9 which in this instance is of rectangular formation. The closure wall itself is of conical form with its concave side downwardly, and the opening 9 is at the apex of the cone. It is clear that this opening 9 is located where the apex proper of the cone would be, and that the wall 8 is therefore properly speaking a frusto-conical wall.

Positioned outside of the closure wall 8 and integrally connected therewith is a measuring cup or compartment 10, this cup or compartment being formed by the two side walls 11 and 12 and by the end wall 13. The side wall 11 extends downwardly from the upper end 13 to a point somewhat above the opening 9, and from that point slopes toward the opposite side of the opening 9 to form a sloping portion 13' by which material is allowed to pass through the opening 9 and be guided into the measuring compartment 10. The side of the opening 9 which is opposite that to which the wall 13' is attached is provided with an upstanding baffle 14 for the purpose of preventing material from flowing back into the container through the opening 9 when the container is returned to upright position after having been inverted for the purpose of filling the compartment 10.

The wall 12 of the compartment 10 extends downwardly from the upper end wall 13 and is curved at its lower edge toward the opening 9, terminating adjacent the upper surface of the closure wall 8. It is noted that the upper end wall 13 of the compartment 10 is just below the normal position of the cover member 3. It is also pointed out that a pair of walls 15 and 16 extend from the opening 9 past the edges of the walls 11 and 12 and are joined to the cylindrical wall 7, thus closing the remaining two sides of the compartment 10 and forming a second compartment or dispensing cup 17 between the wall 12 and the cylindrical wall 7. This dispensing compartment 17 is illustrated as being open at its outer end 18 for the purpose of dispensing the material which has been measured in the measuring compartment 10. The upper edge of the cylindrical wall 7 adjacent the opening 18 is crimped as at 19 to enable the material to be more readily poured therefrom, and the two walls 15 and 16 are bent inwardly adjacent the upper end of the dispensing compartment 17 as shown at 20 and 21 for the purpose of guiding the material in its flow from the dispensing compartment through the opening 18. Also, it is noted that the cover 3 is provided with an opening 22 which may be brought into register with the opening 18 for the purpose of allowing the material to be poured from the dispensing compartment 17, or the cover 3 may be turned to another position so that the upper end of the dispensing compartment will be closed.

For the purpose of varying the effective size of the measuring compartment so that different quantities may be measured thereby depending upon the immediate requirement, this compartment is provided with a shiftable Z-shaped slide. This Z-shaped slide is formed of a stiff material bent at 23 and 24 to form an upright part 25 extending longitudinally of the measuring cup and two horizontal parts 26 and 27 extending transversely of the measuring cup 10 and slidably mounted in its opposite walls 15 and 16. The ends of this strip are bent toward each other as at 28 and 29 for the purpose of preventing the slide from being shifted too far in either direction.

With regard to the operation of this device, the container 1 is first filled to somewhat below the shoulder 6 with the material which is to be dispensed. It is obvious that this material can be placed within the container at the factory which produces the material, and the container utilized for the purpose of shipping the material if so desired.

When it is desired to utilize the dispenser above described, the cover 3 is removed and the dispenser or closure consisting of the closure wall 7 and the two compartments 10 and 17 is placed within the container so as to rest upon the shoulder 6. The cover 3 may then be replaced so that the opening 22 registers with the opening 18, or if desired the cover 3 may be left off during the dispensing operation.

The first step in the dispensing operation is to set the Z-shaped slide so as to measure the proper amount of material to be dispensed. It will be seen that when this slide is moved to the right as illustrated in Figure 2 the effective capacity of the measuring cup or compartment 10 will be reduced, and that when this slide is moved to the left as viewed in this figure, the effective capacity of that compartment will be increased. Thus it is possible to set the slide so as to give the measuring cup the capacity desired.

The container is now inverted so as to allow the material therein to flow against the frusto-conical closure wall 8 and be guided thereby into the opening 9 and thence into the measuring compartment 10 by means of the inclined wall portion 13'. This operation continues until the measuring compartment 10 has been substantially filled, but it will then cease because of the fact that the opening between the baffle 14 and the inclined wall 13' is below the opening between the lower edge of the wall 12 and the upper surface of the closure wall 8 when the container is in inverted position. The container is now returned to its normal position and the material which has been trapped in the measuring compartment 10 will then flow downwardly along the upper inclined surface of the closure wall 8 past the lower edge of the wall 12 and into the dispensing compartment or cup 17. This material will not be allowed to flow back into the container 1 when the container is brought back to its upright position because of the fact that the baffle 14 will prevent such flow. When the material is in this position, however, it will be seen that the opening between the lower edge of the wall 12 and the upper surface of the frusto-conical wall 8 will be substantially sealed by the material which has flowed downwardly from the compartment 10. So long as in this position therefore this material will effectively retard the outer air from entering into the container, and thus protect the material remaining in the container.

When it is desired to dispense the material which has been measured in the measuring cup 10, the container is then again slowly inverted so as to allow substantially all of the material to flow from the compartment 10 into the compartment 17, and thence to be poured through the openings 18 and 22. As soon however as the container has been tilted to a considerable extent, material will again flow from the container through the opening 9 and into the measuring cup 10 to measure off another portion to be dispensed. This process may be continued as and when desired so long as the supply of material in the container is not exhausted. If only one or a few measured portions of the material are required at one time, these may be dispensed from the container, and the container then placed in an upright position to await the time when it is next to be used. It is preferable in such cases that the cover be replaced on the container in such a manner that the opening 22 will not register with the opening 18, thereby preventing the entrance of dirt, dust and other foreign particles. At the same time, the material within the container is more or less sealed from the outer air by the material which has been trapped in the measuring and dispensing compartments at the lower end of the wall 12.

It will be seen, therefore, that a device has been provided for carrying out all of the objects and advantages of this invention.

What I claim is:—

1. In a dispensing device, a container, a closure wall for one end of the container, said closure wall having an opening therethrough and sloping outwardly in all its parts toward said opening, a measuring cup secured to the outside of said closure wall to one side of said opening and having a laterally extending part surrounding said opening to receive material therethrough, said cup also having a wall remote from said opening curved toward said opening at its inner end and spaced from the outer surface of the closure wall, a dispensing cup adjacent said measuring cup and open at its outer end, said dispensing cup communicating with said measuring cup at its inner end through the opening between the curved edge of the wall of said measuring cup and the outer surface of the closure wall, and said closure wall having a part forming a baffle extending outwardly therefrom on the side of the opening adjacent the measuring cup to prevent material from flowing from the measuring cup back through the opening when the container is returned to upright position after being inverted, and a shiftable Z-shaped slide carried by said measuring cup for varying the effective capacity of said measuring cup.

2. In a dispensing device, a container, a closure wall for one end of the container, said closure wall having an opening therethrough and sloping outwardly in all its parts toward said opening, a measuring cup secured to the outside of said closure wall to one side of said opening and having a laterally extending part surrounding said opening to receive material therethrough, baffle means in said laterally extending part to prevent material from flowing from the measuring cup back through the opening when the container is returned to upright position after being inverted, said cup also having its wall remote from said opening curved toward said opening at its inner end and spaced from the outer surface of the closure wall, a dispensing cup adjacent said measuring cup and open at its outer end, said dispensing cup communicating with said measuring cup at its inner end through the opening between the curved edge of the wall of the measuring cup and the outer surface of the closure wall, and a shiftable Z-shaped slide carried by said measuring cup for varying the effective capacity of said measuring cup.

3. In a dispensing device, a container, a closure wall for one end of the container, said closure wall having an opening therethrough and sloping outwardly in all its parts toward said opening, a measuring cup secured to the outside of said closure wall to one side of said opening and having a laterally extending part surrounding said opening to receive material therethrough, baffle means in said laterally extending part to prevent material from flowing from the measuring cup back through the opening when the container is returned to upright position after being inverted, said cup also having its wall remote from said opening curved toward said opening at its inner end and spaced from the outer surface of the closure wall, a dispensing cup adjacent said measuring cup and open at its outer end, said dispensing cup communicating with said measuring cup at its inner end through the opening between the curved edge of the wall of the measuring cup and the outer surface of the closure wall.

4. In a dispensing device, a container, a closure wall for one end of the container, said closure wall having an opening therethrough, a measuring cup secured to the outside of said closure wall and having a part surrounding said opening, means to prevent material from flowing from the measuring cup back through the opening when the container is returned to upright position after being inverted, said cup having its wall remote from said opening curved toward said opening at its inner end and spaced from the outer surface of the closure wall, a dispensing cup adjacent said measuring cup and open at its outer end, said dispensing cup communicating with said measuring cup at its inner end through the opening between the curved edge of the wall of the measuring cup and the outer surface of the closure wall.

5. In a dispensing device, a container, a closure wall for one end of the container, said closure wall having an opening therethrough, a measuring cup secured to the outside of said closure wall and out of alignment with said opening, a sloping wall, laterally disposed with respect to said measuring cup and connecting the wall of said measuring cup closest to said opening with the side of the opening remote from the measuring cup, whereby an inclined slideway will be formed for conducting material from said opening laterally into said measuring cup when the container is inverted, means to prevent material from flowing laterally from the measuring cup to said opening when the container is returned to upright position after being inverted, said cup also having its wall remote from said opening spaced at its inner end from the outer surface of the closure wall, a dispensing cup adjacent said measuring cup and open at its outer end, said dispensing cup communicating with said measuring cup at its inner end through the opening between the edge of the wall of the measuring cup and the outer surface of the closure wall.

6. In a dispensing device, a container, a closure wall for one end of the container, said closure wall having an opening therethrough, a measuring cup secured to the outside of said closure wall and having a part surrounding said opening, means to prevent material from flowing from the measuring cup back through the opening when the container is returned to upright position after being inverted, said cup having its wall remote from said opening spaced from the outer surface of the closure wall, a dispensing cup adjacent said measuring cup and open at its outer end, said dispensing cup communicating with said measuring cup at its inner end through said space between the wall of the measuring cup and the outer surface of the closure wall, and a shiftable Z-shaped slide carried by said measuring cup for varying the effective capacity of said measuring cup.

CHARLES M. DAY.